Patented Dec. 6, 1938

2,138,899

UNITED STATES PATENT OFFICE 2,138,899

PROCESS OF PREPARING HYDROXYLAMINE DERIVATIVES OF CYCLIC COMPOUNDS

Henry H. Bassford, Jr., Naugatuck, Conn., assignor to United States Rubber Products, Inc., New York, N. Y., a corporation of Delaware No Drawing. Application January 16, 1937, Serial No. 121,016

9 Claims. (Cl. 260—563)

This invention relates to an improved process of preparing hydroxylamine derivatives of cyclic compounds, and more particularly to improvements in a process of producing the same by chemical reduction of the corresponding nitro compounds.

An object of the invention is to provide an efficient and economical process of making such derivatives without having to resort to expensive refrigeration equipment, excessive temperatures of reduction, or costly salting out processes at low temperatures. In the latter instance there is also danger of contamination of the final product by the salting out reagent, which tends to reduce the yield of the final product. A further object of the invention is to produce phenylhydroxylamine in good yield by chemical reduction of nitrobenzene at a cost markedly below that available from the practice of other known processes.

According to the invention the nitro-cyclic compound which is to be reduced to the hydroxylamine is added to an aqueous solution saturated, completely or almost completely, with the hydroxylamine of the cyclic compound. The reduction reaction is carried out under non-acidic conditions, and preferably under substantially neutral conditions wherein the aqueous solution contains a small amount, e. g. 2–3%, of an ammonium salt, which salt may also act as a catalyzer of the reaction. The temperature of reduction, while not exceeding the decomposition temperature of the hydroxylamine, should be sufficiently high so that all of the hydroxylamine produced during the run in addition to that present in the mother liquor, which is usually saturated at about room temperature (20° C.), will remain in solution. In the case of phenylhydroxylamine the upper reaction temperature limit should not exceed 45° C. because above this temperature it has been found that phenylhydroxylamine in water solution exposed to air rapidly decomposes to azoxybenzene. After completion of the reaction which in point of time is a relatively short one, the solution is filtered, if necessary, to clarify, and cooled down to about the original saturation temperature employed, whereupon substantially all the hydroxylamine produced during the run separates out as crystals which may be filtered off and dried. The saturated mother liquor may be returned to be used as a starting material for another batch of the hydroxylamine. The process is therefore cyclical.

The following example illustrates the invention more specifically:

*Example 1.*—13 pounds of zinc dust are added during 10 minutes with vigorous agitation to an emulsion of 10 pounds of nitrobenzene with 240 pounds of an aqueous solution saturated at 20° C. with phenylhydroxylamine and containing about 5 pounds of ammonium chloride. The temperature of the zinc hydroxide slurry, after 5 minutes rose to approximately 43° C. The zinc hydroxide is removed by filtration and may be washed with water at 45° C. and further extracted with boiling water to recover adsorbed ammonium chloride. The filtrate upon cooling to 20° C. precipitated out phenylhydroxylamine crystals which may be filtered and dried as desired. The amount of crude phenylhydroxylamine is about 6.5 pounds. The saturated watery mother liquor is returned to the reduction stage for reuse with nitrobenzene. The reaction is represented as follows:

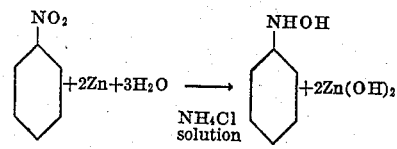

The neutral reduction of the nitro-cyclic compound may be catalyzed by a water-soluble salt of ammonia, substituted ammonia, or alkali earth metal with a non-oxidizing acid whose zinc salt is soluble in water; for example ammonium chloride, ammonium sulphate, ammonium acetate, methyl ammonium chloride, calcium chloride.

Instead of using zinc dust as the reducing agent, various other reducing agents may be used, such as NaHS, acid ammonium sulphide, aluminum or hydrogen.

Instead of cooling the solution to mechanically recover the hydroxylamine from the watery mother liquor, the solution may be used directly, either with or without the addition of alcohol to keep the hydroxylamine in solution, as an intermediate for the preparation of derivatives therefrom; for example, the amino hydroxy derivative may be prepared by rearranging the hydroxylamine at an elevated temperature after first acidifying the solution, and thereafter recovering the amino hydroxy derivative by neutralization and cooling and precipitation from the watery mother liquor. In this way para-amino-phenol may be produced from nitro benzene through the intermediate product phenylhydroxylamine, without necessity of isolating the phenylhydroxylamine.

The invention may be extended to treatment of nitro derivatives of cyclic compounds of the carbocyclic and heterocyclic ring systems, more especially to the unsubstituted nitrobenzenes and its homologues and analogues as well as to the substituted nitro compounds, for example, brom-nitrobenzene, nitro-toluene, nitro-xylene, alpha-nitro-naphthalene, beta-nitro-naphthalene, etc. The nitro-anthracenes and the nitro-anthraquinones may also be used. Furthermore the various heterocyclic nitro bodies, for example, nitro pyridine, nitro-quinoline, nitro-thiophene, and others may be reduced in like manner.

In the case of aromatic compounds whose hydroxylamine is but slightly insoluble in water, the reduction of the nitro compound should be carried out in an aqueous solution to which a mutual solvent of the hydroxylamine and catalyst has been added, for example an aqueous alcoholic solution, in order to avoid using too large a volume of water in the reduction reaction. The solubility can be increased to a convenient amount by the proper proportion of the alcohol, as desired.

Although I have described in detail only the preferred embodiments of the invention, it will be apparent to those skilled in the art that the invention is not limited thereto, that various modifications may be made without departing from the spirit of the invention or from the scope of the appended claims.

Having thus described my invention, what I claim and desire to protect by Letters Patent is:

1. In a process of preparing a hydroxylamine of a cyclic compound by reduction of a nitro-cyclic compound selected from the group consisting of nitro-aromatic compounds and nitro-heterocyclic compounds the step of reducing the nitro compound in the presence of a non-acidic aqueous solution substantially saturated with the desired cyclic hydroxylamine.

2. In a process of preparing an aromatic hydroxylamine by reduction of a nitro-aromatic compound, the step of reducing the nitro compound in the presence of a substantially neutral aqueous solution substantially saturated with the desired aromatic hydroxylamine.

3. In a process of preparing a hydroxylamine of a cyclic compound by reduction of a nitro derivative of the parent cyclic compound selected from the group consisting of nitro-aromatic compounds and nitro-heterocyclic compounds, the steps of reducing the nitro compound while emulsified in a non-acidic aqueous solution substantially saturated with the desired cyclic hydroxylamine, the reduction temperature being above the temperature of said saturation but not exceeding the decomposition temperature of the hydroxylamine in water solution, and thereafter precipitating out and recovering the desired cyclic hydroxylamine by cooling the solution down to approximately the aforesaid temperature of saturation.

4. In a process of preparing a hydroxylamine of a cyclic compound by reduction of a nitro derivative of the parent cyclic compound selected from the group consisting of nitro-aromatic compounds and nitro-heterocyclic compounds, the steps of reducing the nitro compound while emulsified in a substantially neutral aqueous solution substantially saturated with the desired cyclic hydroxylamine and containing from about 2 to about 3 percent of an ammonium salt, the reduction temperature being above the temperature of said saturation but not exceeding the decomposition temperature of the hydroxylamine in water solution, and thereafter precipitating out and recovering the desired cyclic hydroxylamine by cooling the solution down to approximately the aforesaid temperature of saturation.

5. In a process of preparing phenylhydroxylamine by reduction of nitrobenzol the steps of reducing the nitro-benzol while emulsified in a substantially neutral aqueous solution substantially saturated with phenylhydroxylamine, the reduction temperature not exceeding 45° C., and thereafter precipitating out and recovering the phenylhydroxylamine by cooling the solution down to approximately the temperature at which the substantially neutral solution was substantially saturated with phenylhydroxylamine.

6. In a process of preparing an aromatic hydroxylamine which is difficulty soluble in water, by reduction of a nitro-aromatic compound, the step of reducing the nitro compound in the presence of a substantially neutral aqueous solution containing a solvent for the hydroxylamine and which solution is substantially saturated with the desired aromatic hydroxylamine prior to reducing the nitro compound.

7. In a process of preparing a hydroxylamine of an aromatic compound by reduction of a nitro-aromatic compound the step of reducing the nitro compound in the presence of a non-acidic aqueous solution substantially saturated with the desired aromatic hydroxylamine.

8. In a process of preparing a hydroxylamine of an aromatic compound by reduction of a nitro derivative of the parent aromatic compound, the steps of reducing the nitro compound while emulsified in a non-acidic aqueous solution substantially saturated with the aromatic hydroxylamine, the reduction temperature being above the temperature of said saturation but not exceeding the decomposition temperature of the hydroxylamine in water solution, and thereafter precipitating out and recovering the desired aromatic hydroxylamine by cooling the solution down to approximately the aforesaid temperature of saturation.

9. In a process of preparing a hydroxylamine of an aromatic compound by reduction of a nitro derivative of the parent aromatic compound, the steps of reducing the nitro compound while emulsified in a substantially neutral aqueous solution substantially saturated with the desired aromatic hydroxylamine and containing from about 2 to about 3 percent of an ammonium salt, the reduction temperature being above the temperature of said saturation but not exceeding the decomposition temperature of the hydroxylamine in water solution, and thereafter precipitating out and recovering the desired aromatic hydroxylamine by cooling the solution down to approximately the aforesaid temperature of saturation.

HENRY H. BASSFORD, Jr.